(12) United States Patent
Namai (10) Patent No.: US 6,737,836 B2
(45) Date of Patent: May 18, 2004

(54) CONTROL SYSTEM FOR MOTOR-GENERATOR

(75) Inventor: Masao Namai, Gunma (JP)

(73) Assignee: Sawafuji Electric Co., Ltd., Tokyo (JP)

(*) Notice: Subject to any disclaimer, the term of this patent is extended or adjusted under 35 U.S.C. 154(b) by 36 days.

(21) Appl. No.: 10/053,866

(22) Filed: Jan. 24, 2002

(65) Prior Publication Data

US 2002/0096947 A1 Jul. 25, 2002

(30) Foreign Application Priority Data

Jan. 25, 2001 (JP) ........................................ 2001-017316

(51) Int. Cl.$^7$ ................................................ B23B 7/04
(52) U.S. Cl. ............................ 322/44; 322/24; 322/28
(58) Field of Search ................. 322/44, 24, 28

(56) References Cited

U.S. PATENT DOCUMENTS 5,751,069 A * 5/1998 Jajashekara .................. 290/40

* cited by examiner

*Primary Examiner*—Burton S. Mullins
*Assistant Examiner*—Iraj A. Mohandesi
(74) *Attorney, Agent, or Firm*—Arent Fox, PLLC

(57) ABSTRACT

In a control system for a motor-generator capable of functioning as a three-phase magnet-type synchronous motor after starting of an engine and functioning as a brushless DC motor before starting of the engine, a rotated-position detecting device is arranged to detect an induced voltage in each of three-phase coils included in the motor-generator and to detect a rotated position of a rotor based on such induced voltage. Thus, the rotated position of the rotor can be detected without use of a sensor, whereby the operation for assembling the motor-generator can be simplified.

1 Claim, 7 Drawing Sheets

CONTROL SYSTEM FOR MOTOR-GENERATOR

BACKGROUND OF THE INVENTION

1. Field of the Invention

The present invention relates to a control system for a motor-generator capable of functioning as a three-phase magnet-type synchronous motor after starting of an engine and functioning as a brushless DC motor before starting of the engine.

2. Description of the Related Art

To allow the motor-generator to function as the brushless DC motor before starting of the engine, it is necessary to detect a rotated position of a rotor included in the motor-generator to control the energization of a three-phase coil. In a conventional control system, a sensor such as a hall element and a photocoupler is used.

In a control system using a sensor such as a hall element and a photocoupler as in the prior art, it is difficult to fixedly dispose the sensor in proximity to the rotor of the motor-generator with a good accuracy. In addition, since wires for taking out a signal from the sensor are large in number and complicated and for this reason, the operation for assembling the motor-generator is complicated.

SUMMARY OF THE INVENTION

Accordingly, it is an object of the present invention to provide a control system for a motor-generator, wherein a rotated position of a rotor can be detected without use of a sensor, whereby the operation for assembling the motor-generator can be simplified.

To achieve the above object, according to the present invention, there is provided a control system for a motor-generator, comprising a rotated-position detecting means for detecting a rotated position of a rotor included in a motor-generator which is connected to an engine in such a manner that the motor-generator can function as a three-phase magnet-type synchronous motor after starting of the engine, and a control unit for controlling a DC power produced by rectifying an AC power from a commercial power source based on an output from the rotated-position detecting means and supplying the DC power to each of three-phase coils included in the motor-generator, the motor-generator being capable of functioning as a brushless DC motor before starting of the engine, wherein the rotated-position detecting means is arranged to detect an induced voltage in each of the three-phase coils included in the motor-generator and to detect a rotated position of the rotor based on the induced voltage.

With such arrangement, to allow the motor-generator to function as the brushless DC motor before starting of the engine, the rotated position of the rotor is detected by detecting the induced voltage in each of the three-phase coils. Therefore, a sensor such as a hall element and a photocoupler required in the prior art system is not required. Thus, it is possible to overcome the complexity of the assembling operation due to the use of the sensor and to simplify the operation for assembling the motor-generator.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of embodiments with reference to the accompanying drawings.

FIGS. 1 to 6 show a first embodiment of the present invention.

Figure 1:
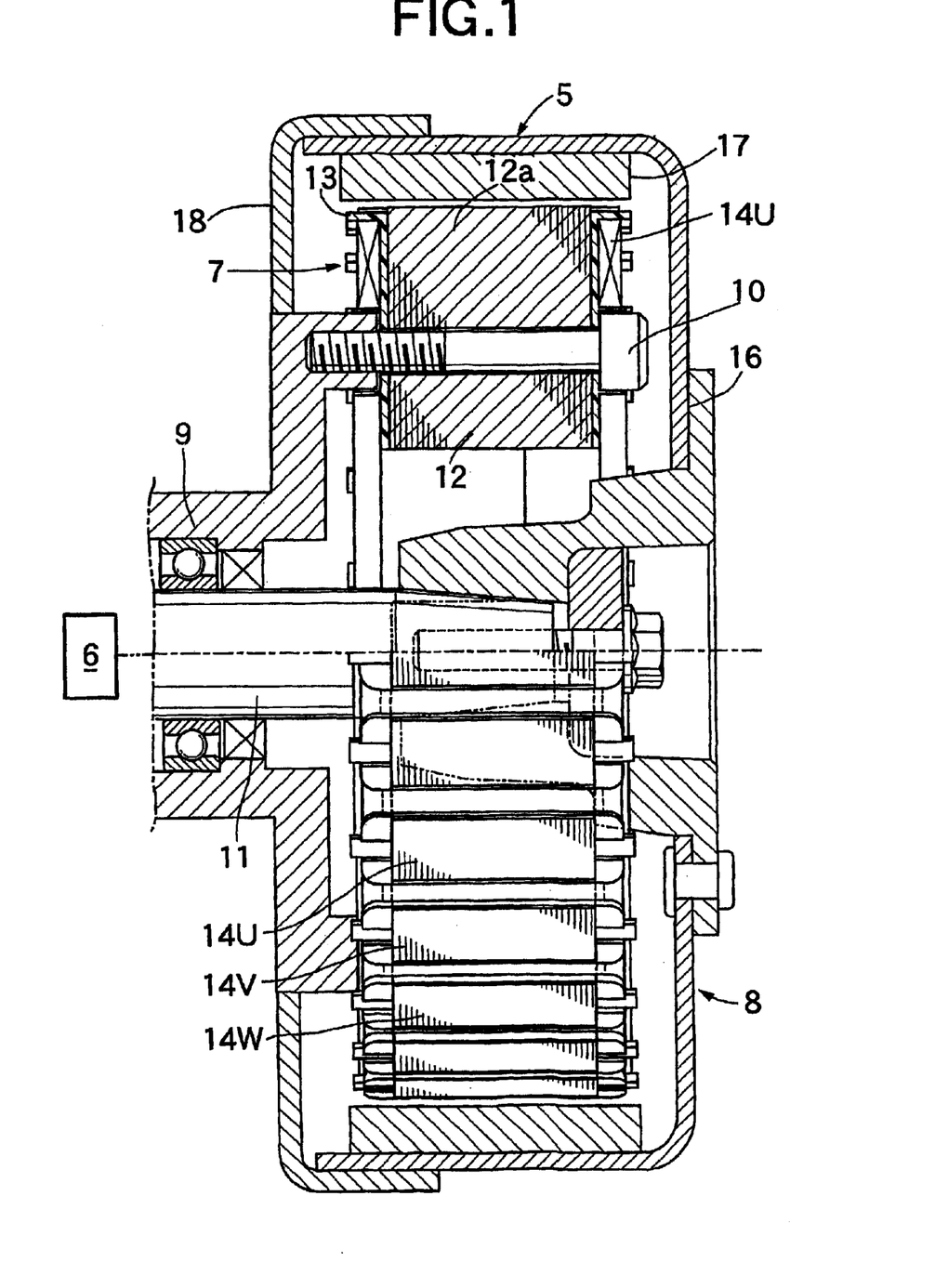
FIG. 1 is a vertical sectional view of a motor-generator according to a first embodiment of the present invention.

Referring first to FIG. 1, a motor-generator 5 is connected to an engine 6 operated by using a fuel gas such as a natural gas as a fuel so that a waste heat from the engine 6 is utilized for heating, thus constituting a portion of a combination system. After starting of the engine 6, the motor-generator 5 functions as a three-phase magnet-type synchronous motor, and before starting of the engine 6, the motor-generator 5 functions as a brushless DC motor.

A stator 7 of the motor-generator 5 also serving the motor is fixed and supported on a sleeve 9 leading to an engine body (not shown) of the engine 6 by a plurality of bolts 10, and a crankshaft 11 of the engine 6 is disposed coaxially within the sleeve 9 to extend coaxially through a stator 7. A rotor 8 is connected coaxially to an end of the crankshaft 11.

The stator 7 includes a stator core 12 having a plurality of salient poles 12a around an outer periphery thereof, a bobbin 13 made of a synthetic resin and covering the stator core 12 in such a manner that tip ends of the salient poles 12a and a partial inner peripheral surface of the stator core 12 are exposed, and the same numbers of U-phase, V-phase and W-phase coils 14U, 14V and 14W. The coils 14U, 14V and 14W in the respective phases are wound around portions of the bobbin 13 corresponding to the salient poles 12a, respectively.

Figure 2:
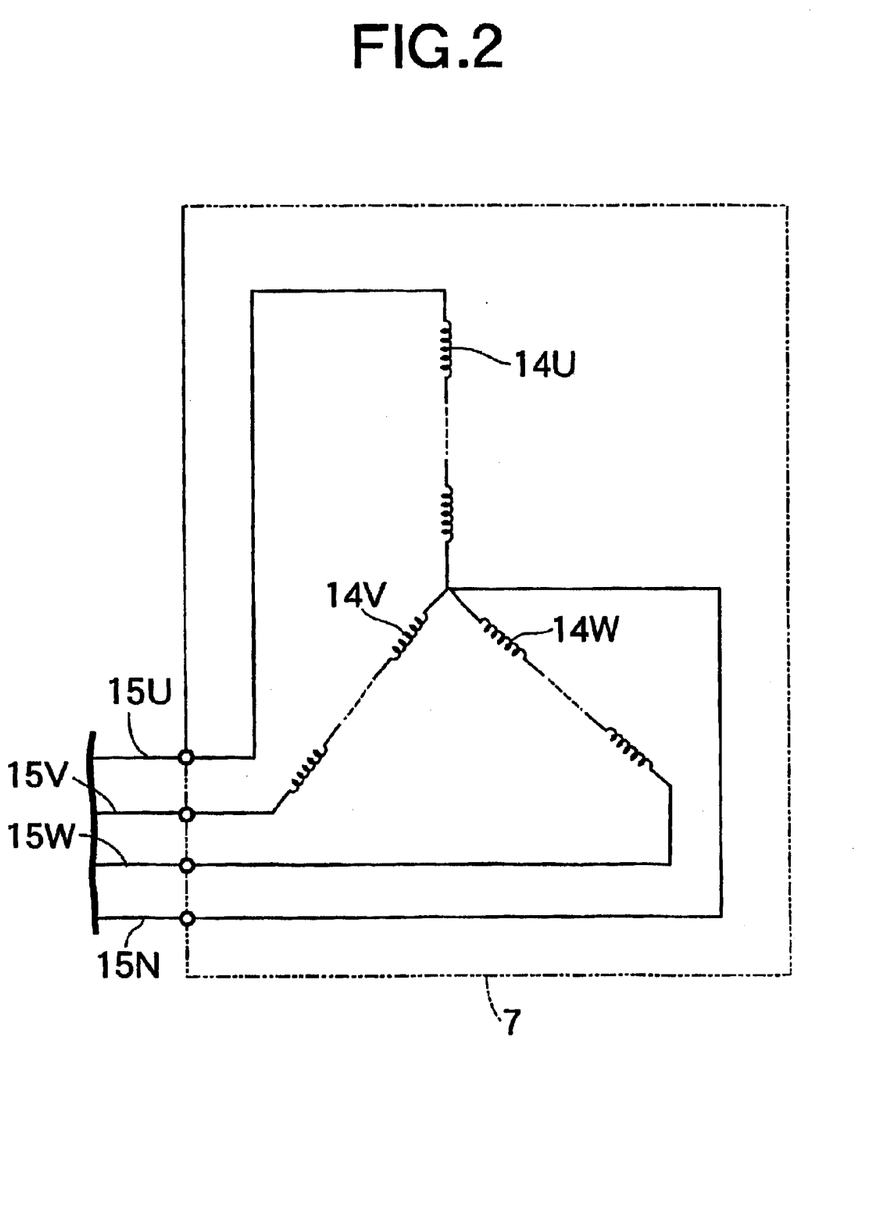
FIG. 2 is a diagram of wires for connecting coils provided in a stator of the motor-generator.

Referring also to FIG. 2, the pluralities of coils 14U, 14V, and 14W connected in series in the respective phases are connected at one ends thereof individually to conductors 15U, 15V, and 15W, and connected at the other ends commonly to a conductor 15N as a neutral point.

Referring again to FIG. 1, the rotor 8 includes a rotor yoke 16 formed into a bowl shape to cover the stator 7 and fastened coaxially to an end of the crankshaft 11, and a permanent magnet 17 secured to an inner periphery of the rotor yoke 16 to define a small air gap between the permanent magnet 17 and the stator 7.

A cover 18 is secured to the sleeve 9 to cover an open end of the rotor yoke 16.

Figure 3:
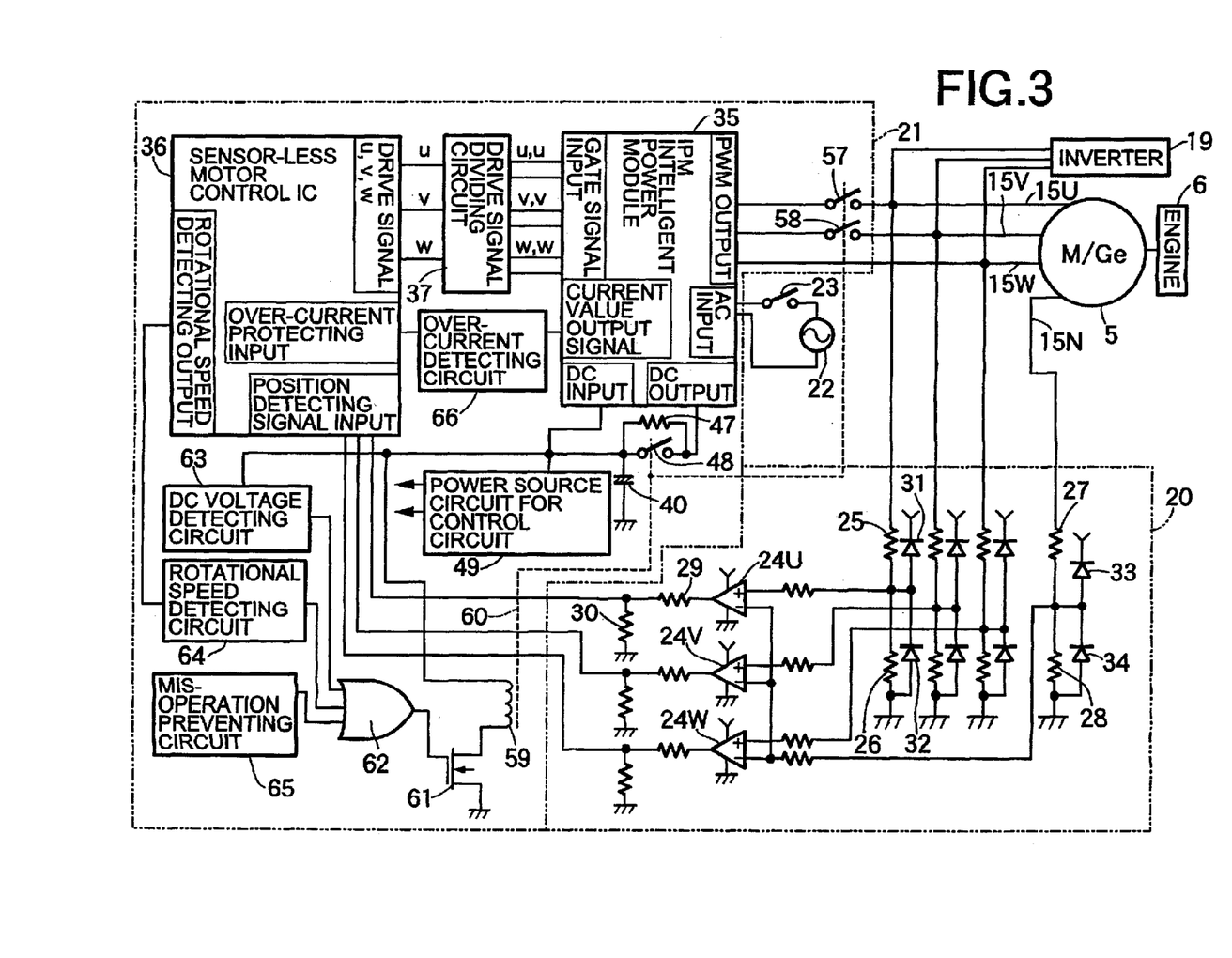
FIG. 3 is a circuit diagram showing the arrangement of a control system.

Referring to FIG. 3, the conductors 15U, 15V and 15W leading to the one ends of the coils 14U, 14V and 14W included in the motor-generator 5 are commonly connected to an inverter circuit 19, and when the motor-generator 5 is driven by the engine 6 to function as the three-phase magnet-type synchronous motor, an AC power is output from the inverter circuit 19.

A control system for ensuring that the motor-generator 5 functions as the brushless DC motor before starting of the engine 6 includes a rotated-position detecting means 20 for detecting a rotated position of the rotor 8 included in the motor-generator 5, and a control unit 21 for controlling the DC current produced by rectification of an AC current from a commercial power source 22 based on an output from the rotated-position detecting means 20 and supplying the DC current to the three-phase coils 14U, 14V and 14W included in the motor-generator 5. When a starting switch 23 is turned on, an AC current is supplied from the commercial power source 22 to the control unit 21.

The rotated-position detecting means 20 is adapted to detect induced voltages in the coils 14U, 14V and 14W in the respective phases included in the motor-generator 5 and to detect a rotated position of the rotor 5 based on the induced voltages, and includes comparators 24U, 24V and 24W individually corresponding to the coils 14U, 14V and 14W in the respective phases, respectively.

A voltage output from the conductor 15U connected to one ends of the U-phase coils 14U is divided in voltage-dividing resistors 25 and 26 and input to a non-inverted input terminal of the comparator 24U corresponding to the U-phase coils 14U. Voltages output from the conductors 15V and 15W connected to the one ends of the V-phase coils 14V and the W-phase coils 14W are divided in the same manner as in the comparator 24U and input to non-inverted input terminals of the comparators 24V and 24W corresponding to the V-phase coils 14V and W-phase coils 14W.

A voltage output from the conductor 15N connected commonly to the other ends of the coils 14U, 14V and 14W in the respective phases is divided in voltage-dividing resistors 27 and 28 and input to non-inverted input terminals of the comparators 24U, 24V and 24W.

Namely, when the induced voltage in each of the coils 14U, 14V and 14W is increased by passing of the permanent magnet 17 included in the rotor 8, each of the comparators 24U, 24V and 24W outputs a high-level signal.

Such voltage output from each of the comparators 24U, 24V and 24W is further divided in voltage-dividing resistors 29 and 30, and the resulting voltage is input to a sensor-less motor control IC 36 constituting a portion of the control unit 21.

A voltage in a power source for the sensor-less motor control IC 36 is a low level, e.g., 5 V, and a voltage input to the sensor-less motor control IC 36 from the rotated-position detecting means 20 must be also a low level equal to or lower than the voltage in the power source for the sensor-less motor control IC 36. However, if the voltage in a power source for each of the comparators 24U, 24V and 24W included in the rotated-position detecting means 20 is set at a low level, the ratio of voltage division by the voltage-dividing resistors 27 and 28 is increased, resulting in an increased detection error. Therefore, the voltage in the power source for each of the comparators 24U, 24V and 24W is set at a high level, e.g., 15 V, and the voltage output from each of the comparators 24U, 24V and 24W is divided in the voltage-dividing resistors 28 and 30, whereby the detection accuracy can be enhanced.

On the input side of the comparators 24U, 24V and 24W, the voltage-dividing resistors 25 and 26 are connected to a power source voltage line through diodes 31 and grounded through diodes 32. Connection points of the voltage-dividing resistors 27 and 28 are connected to the power source voltage line through diodes 33 and grounded through diodes 34. Such arrangement makes it possible to protect the comparators 24U, 24V and 24W and to prevent the malfunctions of them.

The control unit 21 includes an intelligent power module (which will be referred to as IPM hereinafter) 35, the sensor-less motor control IC 36 adapted to output drive signals for the coils 14U, 14V and 14W in the respective phases upon reception of a signal from the rotated-position detecting means 20, and a drive signal dividing circuit 37 for dividing the drive signals from the sensor-less motor control IC 36 into drive signals corresponding to the IPM 35.

Figure 4:
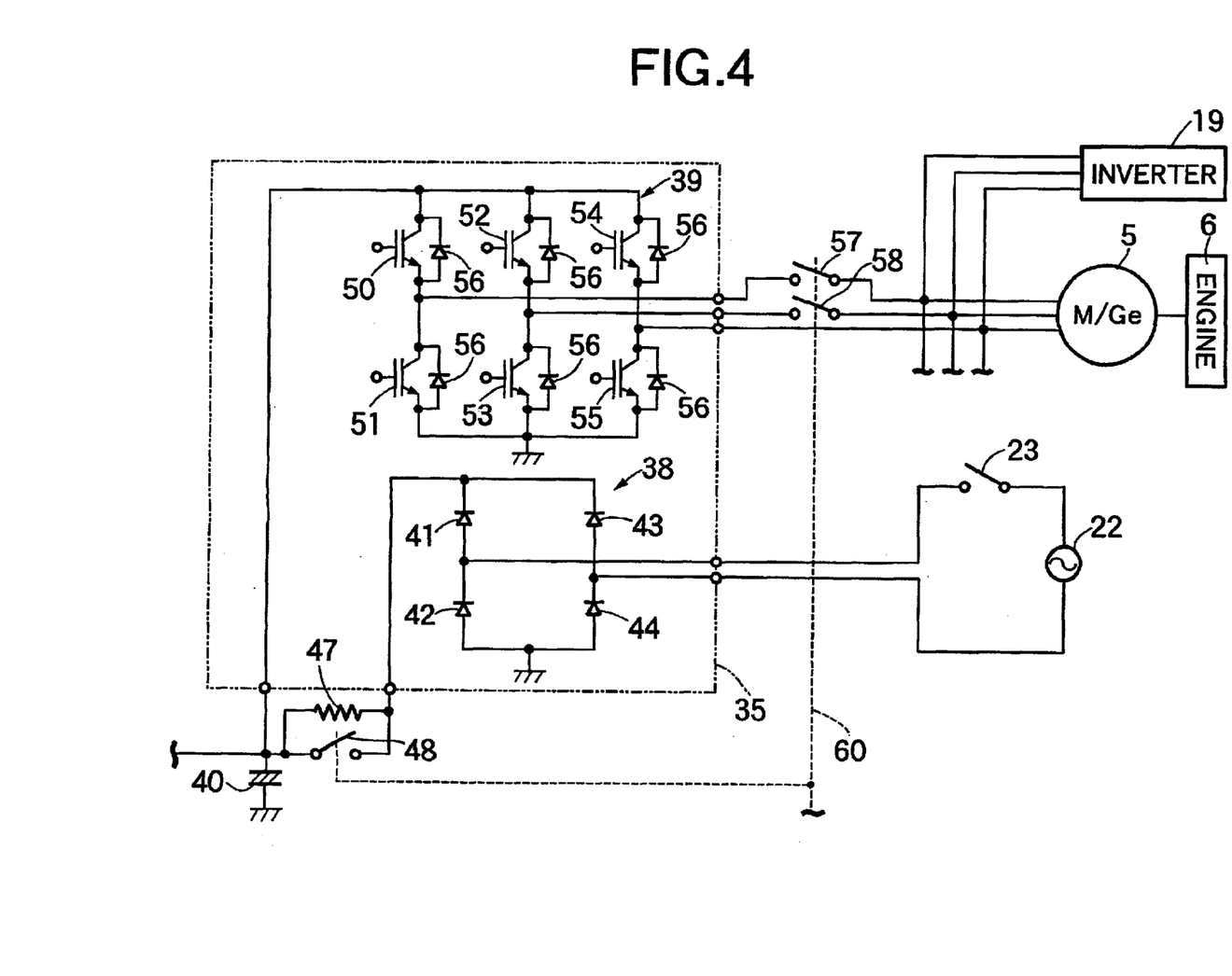
FIG. 4 is a circuit diagram showing a portion of the internal arrangement of an intelligent power module.

Referring to FIG. 4, the IPM 35 includes a rectifying circuit 38 adapted to convert the AC power input from the commercial power source 22 into a DC power to apply it to a capacitor 40, when the starting switch 23 is in its turned-on state, and an inverter circuit 39 adapted to convert a DC voltage from the capacitor 40 into an AC voltage.

The rectifying circuit 38 is comprised of two sets of pairs of diodes 41, 42 and 43, 44 connected in series to each other in each pair. The commercial power source 22 is connected to connection points of the diodes 41 and 42 through the starting switch 23 and to connection points of the diodes 43 and 44.

The rectifying circuit 38 is connected to the capacitor 40 located outside the IPM 35 through a resistor 47, to which a first relay switch 48 is connected in parallel. A power source circuit 49 (see FIG. 3) for the control circuit is connected to the capacitor 40.

The first relay switch 48 is kept turned-off in a state in which a DC voltage output from the rectifying circuit 38 is low, and at an initial stage of turning-on of the starting switch 23, DC current from the rectifying circuit 38 flows into the capacitor 40 through the resistor 47. Therefore, the DC current from the rectifying circuit 38 never flows into the capacitor 40 suddenly in response to the turning-on of the starting switch 23.

The inverter circuit 39 comprises three sets of pairs of IGBTs 50, 51; 52, 53; and 54, 55 connected in series in each pair between the capacitor 40 and the ground, and six diodes 56 connected in parallel to the IGBTs 50 to 55, respectively, and drive signals from the drive signal dividing circuit 37 are input to gates of the IGBTs 50 to 55, respectively. A connection point between the IGBTs 50 and 51 forming the pair is connected to the U-phase coils 14U of the motor-generator 5 through a second relay switch 57 and the conductor 15U; a connection point between the IGBTs 52 and 53 forming the pair is connected to the V-phase coils 14V of the motor-generator 5 through a third relay switch 58 and the conductor 15V; and a connection point between the IGBTs 54 and 55 forming the pair is connected to the W-phase coils 14W of the motor-generator 5 through the conductor 15W.

Thus, by controlling the turning-on/off of the IGBTs 50 to 55 by the drive signals input to the gates thereof, the induced currents in the U-phase, V-phase and W-phase coils 14U, 14V and 14W of the motor-generator 5 are controlled, whereby the motor-generator 5 functions as the brushless DC motor.

The first, second and third relay switches 48, 57 and 58 constitute a relay 60 by cooperation with a relay coil 59 connected to the capacitor 40. The relay coil 59 is grounded through an FET 61, and an output from an OR circuit 62 is input to a gate of the FET 61. Outputs from a DC voltage detecting circuit 63, a rotational speed detecting circuit 64 and a malfunction protecting circuit 65 are input in parallel to the OR circuit 62.

Thus, when an output from the OR circuit 62 assumes a high level in response to a signal output from at least one of the circuits 63, 64 and 65 assuming a high level, the FET 61 is cut off electrically, and the first, second and third relay switches 48, 57 and 58 are cut off electrically.

The DC voltage detecting circuit 63 is adapted to output a high-level signal in response to a DC voltage input to the IPM 35 assuming equal to or higher than a preset value. When the motor-generator 5 is brought into a state in which it functions as the magnet-type synchronous motor by the starting of the engine 6, and in response to this, the voltage from the magnet-type synchronous motor boosts the DC voltage, a high-level signal is output from the DC voltage detecting circuit 63.

The rotational speed detecting circuit 64 is adapted to output a high-level signal in response to the rotational speed of the motor-generator 5 input from the sensor-less motor control IC 36 assuming equal to or higher than a preset value Nc. The sensor-less motor control IC 36 calculates the rotational speed of motor-generator 5 upon reception of the signal from the rotated-position detecting means 20.

Moreover, if a starting rotational speed at which the engine 6 is started is represented by Na, and an abnormal rotational speed is represented by Nb which is set larger than the starting rotational speed Na in order to determine such an abnormal state of the engine 6 that the engine 6 is not started even if the motor-generator 5 is rotated at a rotational speed exceeding the starting rotational speed Na, the preset rotational speed Nc is set to provide a relation, Na<Nc≦Nb among the rotational speeds Nc, Nb and Nc.

If the preset rotational speed is determined as described above, when the engine 6 in a normal state has been started at a rotational speed equal to or lower than the preset rotational speed Nc, a high-level signal is output from the rotational speed detecting circuit 64 later than the starting of the engine 6. However, the high-level signal is output from the DC voltage detecting circuit 63 immediately in response to the starting of the engine 6 and hence, the second and third relay switches 57 and 58 are electrically cut off immediately in response to the starting of the engine 6 and thus, a trouble cannot be arisen in the IPM 35.

Even if the rotational speed of the motor-generator 5 is increased to exceed the starting rotational speed Na, the high-level signal cannot be output from the DC voltage detecting circuit 63 in the abnormal state of the engine 6 in which the engine 6 is not started. However, the high-level signal is output from the rotational speed detecting circuit 64 in response to the rotational speed of the motor-generator 5 assuming equal to or higher than the preset rotational speed substantially smaller than the abnormal rotational speed Nb, whereby the second and third relay switches 57 and 58 are cut off electrically. Therefore, the motor-generator 5 cannot function as the brushless DC motor, and it is possible to prevent the U-phase, V-phase and W-phase coils 14U, 14V and 14W included in the motor-generator 5, the inverter circuit 39 of the IPM 35 and the like from being broken due to rises in temperature of them.

The IPM 35 has a function to detect a DC current input thereto, and the detected DC current is input to an overcurrent detecting circuit 66. The over-current detecting circuit 66 determines whether the DC current input to the IPM 35 is equal to or larger than the preset value, and when the DC current input to the IPM 35 is equal to or larger than the preset value, the over-current detecting circuit 66 delivers a signal indicative of such fact to the sensor-less motor control IC 36. Thus, the sensor-less motor control IC 36 limits the induced currents in the coils 14U, 14V and 14W included in the motor-generator 5 functioning as the brushless DC motor in such a manner that when the DC current input to the IPM 35 is equal to or larger than the preset value, the pulse width of the drive signal applied to the drive signal dividing circuit 37 is decreased.

Figure 5:
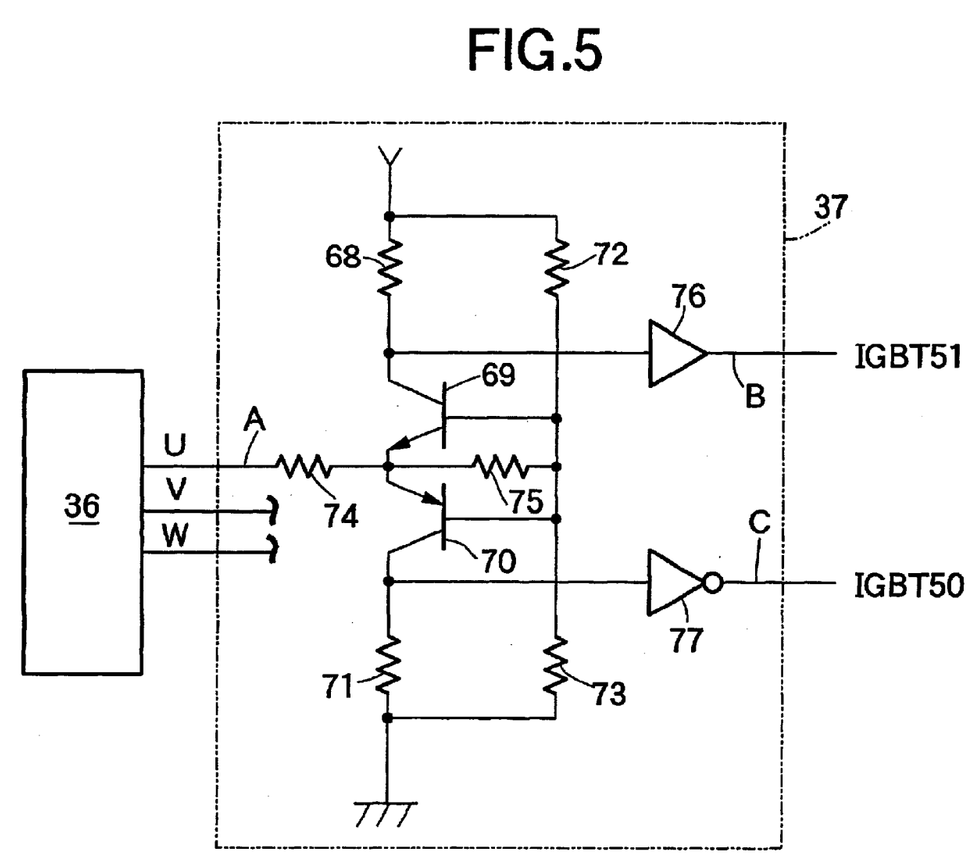
FIG. 5 is a circuit diagram showing a portion of a circuit diagram showing a portion of a drive signal dividing circuit.

Referring to FIG. 5, the drive signal dividing circuit 37 includes resistors 68, 71, 74 and 75, an NPN transistor 69, a PNP transistor 70, a buffer 76 and an inverter 77 in locations corresponding to the U-phase coils 14U of the motor-generator 5.

A series circuit comprising the resistor 68, the NPN transistor 69, the PNP transistor 70 and the resistor 71 and a series circuit comprising the resistors 72 and 73 are connected in series between the power source and the ground. A connection point between the resistors 72 and 73 is connected to bases of the NPN transistor 69 and the PNP transistor 70, and a connection point between the NPN transistor 69 and the PNP transistor 70 is connected to the connection point between the resistors 72 and 73 through the resistor 75. The drive signal output from the sensor-less motor control IC 36 in correspondence to the U-phase coils 14U is input to the connection point between the NPN transistor 69 and the PNP transistor 70 through the resistor 74. A connection point between the resistor 68 and the NPN transistor 69 is connected to the buffer 76, and a connection point between the PNP transistor 70 and the resistor 71 is connected to the inverter 77.

An output from the buffer 76 is input to a gate of one 51 of the pair of IGBTs 50 and 51 corresponding to the U-phase coils 14U in the IPM 35 and the inverter circuit 39, and an output from the inverter 77 is input to a gate of the other 50 of the pair of IGBTs 50 and 51 corresponding to the U-phase coils 14U.

Figure 6:
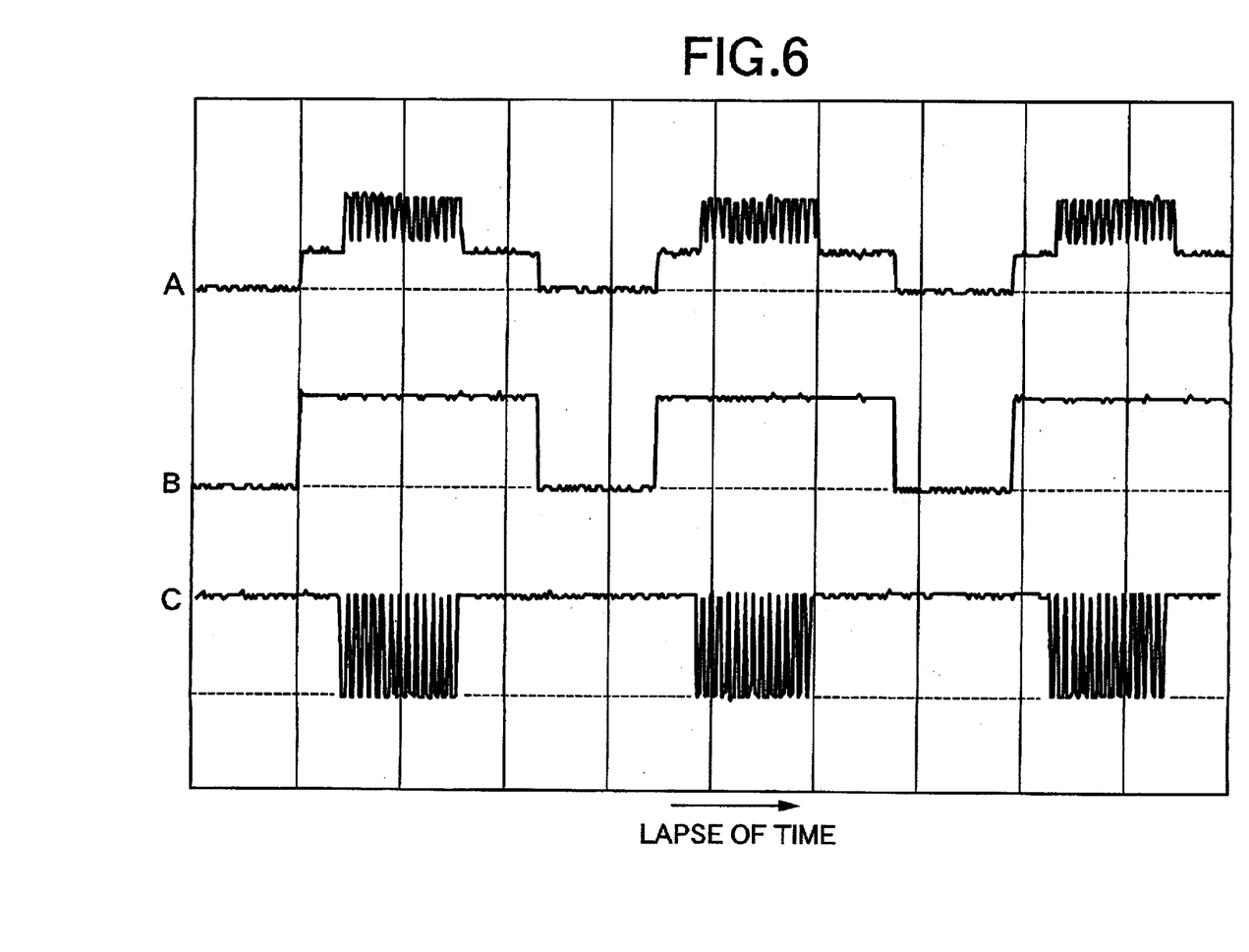
FIG. 6 is a timing chart for the circuit shown in FIG. 5.

In such circuit, signals indicated by A, B and C in FIG. 5 are varied as shown in FIG. 6. The signal (A) applied from the sensor-less motor control IC 36 to the drive signal dividing circuit 37 in correspondence to the U-phase coils 14U is divided into two signals (C and B) in correspondence to the pair of IGBTs 50 and 51 included in the inverter circuit 39 of the IMP 35 in correspondence to the U-phase coils 14U, and such two signals are output from the drive signal dividing circuit 37.

The arrangements of the drive signal dividing circuit 37 in a section corresponding to the V-phase coils 14V of the motor-generator 5 and in a section corresponding to the V-phase coils 14V of the motor-generator 5 are constructed identically with the circuit shown in FIG. 5. Each of the signals applied from the sensor-less motor control IC 36 to the drive signal dividing circuit 37 in correspondence to the V-phase coils 14V and the W-phase coils 14W is divided into two signals in correspondence to the pair of IGBTs 53 and 52 included in the inverter circuit 39 of the IPM 35 in correspondence to the V-phase coils 14V as well as in correspondence to the pair of IGBTs 55 and 54 included in the inverter circuit 39 in correspondence to the W-phase coils 14W.

The operation of the first embodiment will be described below. The rotated-position detecting means 20 included in the control system for allowing the motor-generator 5 to function as the brushless DC motor before starting of the engine 6 is arranged to detect the induced voltages in the three-phase coils 14U, 14V and 14W included in the motor-generator 5 and to detect the rotated position of the rotor 8 based on such induced voltages, and hence, the operation for assembling the motor-generator 5 can be simplified.

More specifically, in a conventional rotated-position detecting means adapted to detect a rotated position of a rotor 8 using a sensor such as a hall element and a photocoupler, it is difficult to fixedly dispose the sensor with a good accuracy in proximity to a rotor 8 of a motor-generator 5, and wires for taking out a signal from the sensor are increased in number and complicated and as a result, the operation for assembling the motor-generator is troublesome. In contrast, in the motor-generator according to the present invention, the rotated position of the rotor 8 can be detected without use of a sensor and thus, the operation for assembling the motor-generator can be simplified.

Figure 7:
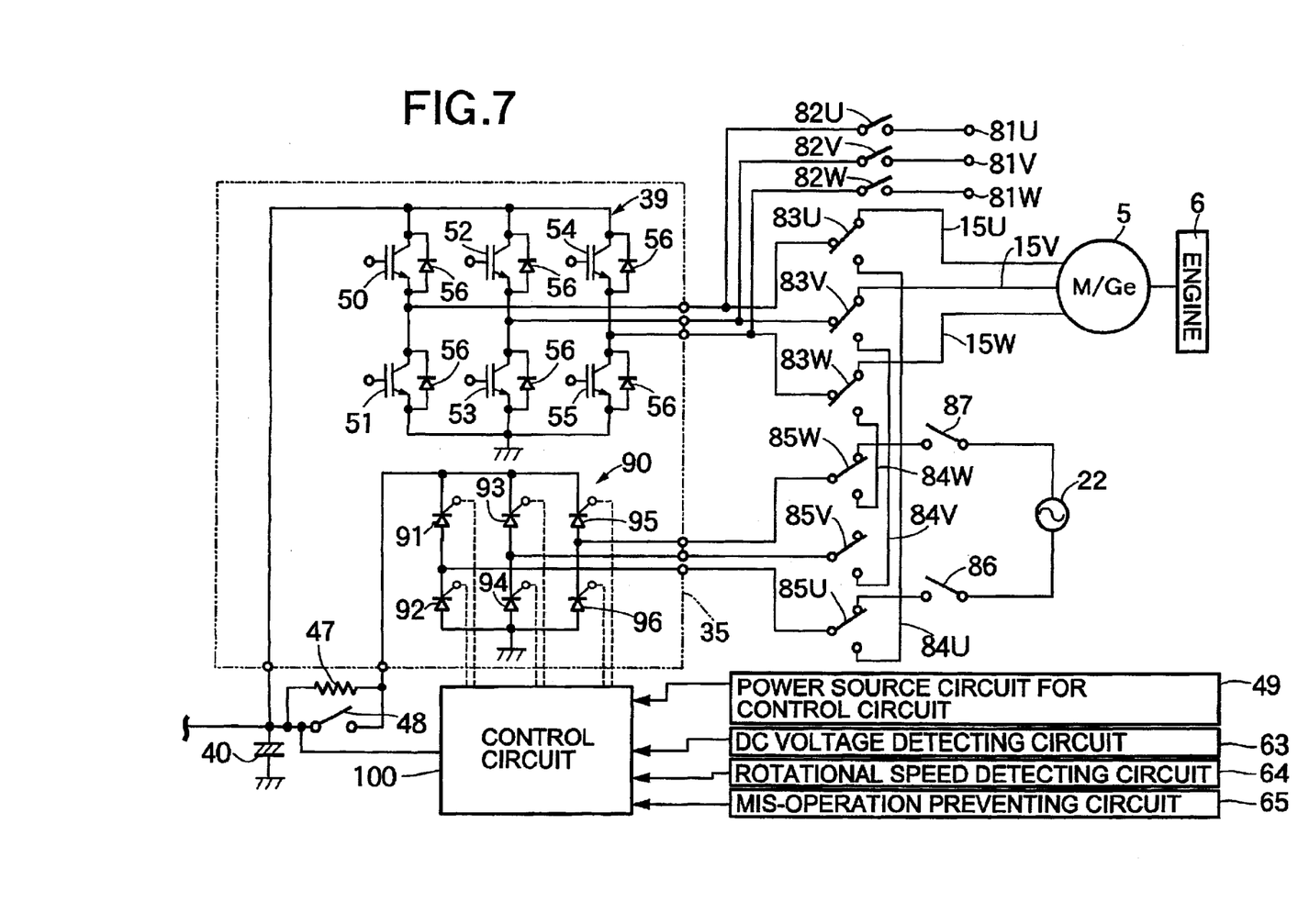
FIG. 7 is a circuit diagram showing the arrangement of a portion of a control system according to a second embodiment of the present invention.

FIG. 7 shows a second embodiment of the present invention, wherein portions or components corresponding to those in the first embodiment are designated by the same reference numerals and symbols.

An IPM 35' includes an inverter circuit 39 and a three-phase rectifying circuit 90. Connection points between IGBTs 50, 51; 52, 53; and 54, 55 forming pairs respectively in the inverter circuit 39 are connected to output terminals 81U, 81V and 81W through opening/closing switches 82U, 82V and 82W and to change-over switches 83U, 83V and 83W, respectively. Each of the change-over switches 83U, 83V and 83W is capable of being alternately switched over between a first state in which it permits the connection point between the corresponding IGBTs 50, 51; 52, 53; 54, 55 to be electrically connected to corresponding one of conductors 15U, 15V, 15W individually leading to the coils in the corresponding phase of the motor-generator 5, and a second state in which it permits the corresponding conductor 15U, 15V, 15W to be electrically connected to a corresponding conductor 84U, 84V, 84W.

The three-phase rectifying circuit 90 is comprised of three sets of pairs of thyristors 91, 92; 93, 94; and 95, 96 connected in series in each pair. The current and voltage in a gate of each of the thyristors 91, 92; 93, 94; and 95, 96 are controlled by a control circuit 100 to which a power source voltage is supplied from a power source circuit 49 for the control circuit. Signals from the DC voltage detecting circuit 63, the rotational-speed detecting circuit 64 and the malfunction protecting circuit 65 are input to the control circuit 100.

In the three-phase rectifying circuit 90, the connection points between the thyristors 91, 92; 93, 94; and 95, 96 forming the pairs are connected to a common contact of the changeover switches 85U, 85V and 85W. The opening/closing switches 86 and 87 are connected to opposite ends of the commercial power source 22, respectively.

Thus, the changeover switch 85U is capable of being alternately switched over between a first state in which it permits a connection point between the thyristors 91 and 92 to be electrically connected to a contact of one of the opening/closing switches 86, and a second state in which it permits the connection point between the thyristors 91 and 92 to be electrically connected to the conductor 84U. The changeover switch 85W is capable of being switched over alternately between a first state in which it permits a connection point between the thyristors 95 and 96 to be connected electrically to a contact of one of the opening/closing switches 87, and a second state in which it permits the connection point between the thyristors 95 and 96 to be connected electrically to the conductor 84W. The changeover switch 85V is capable of being switched over alternately between a first state in which it permits a connection point between the thyristors 93 and 94 to be cut off electrically from a contact of the conductor 84V, and a second state in which it permits the connection point between the thyristors 93 and 94 to be connected electrically to the conductor 84V.

According to the second embodiment, to allow the motor-generator 5 to function as the brushless DC motor, the opening/closing switches 82U, 82V and 82W may be cut off electrically; the opening/closing switches 86 and 87 may be connected electrically to each other; and the changeover switches 83U, 83V, 83W; 85U, 85V, 85W may be brought into their first states, as shown in FIG. 5; and the current and voltage in the gates of the thyristors 91, 92; 93, 94; 95, 96 of the three-phase rectifying circuit 90 may be controlled by the control circuit 100 in order to bring the thyristors 91, 92; 93, 94; 95, 96 of the three-phase rectifying circuit 90 into full conduction and operate them to function as the diodes. Thus, the coils in the individual phases of the motor-generator 5 are sequentially exited by the output from the inverter circuit 39 of the IMP 35', whereby the motor-generator 5 is rotated to start the engine 6.

On the other hand, to allow the motor-generator 5 to function as the magnet-type synchronous motor after starting of the engine 6, the opening/closing switches 82U, 82V and 82W maybe connected electrically; the opening/closing switches 82U, 82V and 82W may be cut off electrically; and the changeover switches 83U, 83V, 83W and 85U, 85V, 85W may be brought into their second states; and the current and voltage in the gates of the thyristors 91, 92; 93, 94; 95, 96 of the three-phase rectifying circuit 90 may be controlled, so that the DC voltage of the capacitor 40 is constant. Thus, the inverter circuit 39 of the IPM 35' is disconnected from the motor-generator 5, and a three-phase AC output produced with a variation in voltage due to a variation in rotation of the engine from the motor-generator is converted into a given DC voltage by the three-phase rectifying circuit 90, further converted into an AC power by the inverter circuit 39, and then output from the output terminals 81U, 81V and 81W.

By providing the opening/closing switches 82U, 82V, 82W, 86, 87 and the changeover switches 83U, 83V, 83W and 85U, 85V, 85W in the above manner, the inverter circuit 19 required in the first embodiment can be eliminated, leading to a reduction in cost.

As described above, according to the present invention, in allowing the motor-generator to function as the brushless DC motor before starting of the engine, it is possible to eliminate conventionally-required sensors such as a hall element and a photocoupler, to thereby simplify the operation for assembling the motor-generator.

Although the embodiments of the present invention have been described in detail, it will be understood that the present invention is not limited to the above-described embodiments, and various modifications in design may be made without departing from the spirit and scope of the invention defined in the claim.

What is claimed is:

1. A control system for a motor-generator, comprising a rotated-position detecting means for detecting a rotated position of a rotor included in a motor-generator which is connected to an engine in such a manner that the motor-generator can function as a three-phase magnet-type synchronous motor after starting of the engine, and a control unit for controlling a DC power produced by rectifying an AC power from a commercial power source based on an output from the rotated-position detecting means and supplying the DC power to each of three-phase coils included in said motor-generator, said motor-generator being capable of functioning as a brushless DC motor before starting of the engine, wherein said rotated-position detecting means is arranged to detect an induced voltage in each of the three-phase coils included in the motor-generator and to compare said induced voltage with a voltage output from a conductor which serves as a neutral point commonly connected to said three-phase coils thereby to detect a rotated position of the rotor.

* * * * *